United States Patent [19]
Caravito

[11] 4,057,302
[45] Nov. 8, 1977

[54] REMOVABLE TREAD BELT

[75] Inventor: V. A. Caravito, Uniontown, Ohio

[73] Assignee: The Goodyear Tire & Rubber Company, Akron, Ohio

[21] Appl. No.: 646,434

[22] Filed: Jan. 5, 1976

[51] Int. Cl.² .......................................... B62D 55/24
[52] U.S. Cl. ...................................... 305/19; 152/188; 305/38
[58] Field of Search ............... 305/19, 35 EB, 38, 54; 152/175, 176, 187, 188, 193, 194, 198, 199, , 227, 228, 210, 211; 29/183, 155 R; 52/732, 733, 738; 198/847

[56] References Cited
U.S. PATENT DOCUMENTS

| | | | |
|---|---|---|---|
| 2,037,983 | 4/1936 | Johnston | 305/38 |
| 3,773,394 | 11/1973 | Grawey | 305/38 |
| 3,897,814 | 8/1975 | Grawey | 152/175 X |
| 3,899,220 | 8/1975 | Grawey et al. | 305/19 |

Primary Examiner—Allen N. Knowles
Assistant Examiner—John P. Shannon
Attorney, Agent, or Firm—F. W. Brunner; R. P. Yaist

[57] ABSTRACT

A removable tread installed as an annular belt about the circumference of a tire carcass. The inner surface of the removable tread belt and the outer surface of the tire carcass have an interengaging pattern to interlock the two. The removable tread belt has a plurality of axially oriented metal bars and an inextensible circumferential belt radially outwardly from the bars. The cross-section of the bars is substantially T-shaped, and the bars are provided with enlarged portions at each end. The ends of the bars extend outwardly to a point at least equal to the widest portion of the tire carcass sidewall. The bars and the inextensible belt are encapsulated in a matrix of rubber, which has a tread pattern on its outer circumferential surface.

15 Claims, 5 Drawing Figures

U.S. Patent  Nov. 8, 1977  Sheet 2 of 2  4,057,302

REMOVABLE TREAD BELT

BACKGROUND OF THE INVENTION

This invention relates generally to a removable tread belt for tires, and more particularly to such for use in tires for heavy equipment such as earth movers and the like.

Removable tread belts have been used in automotive, truck and aircraft tires. They offer the advantages of allowing a tire carcass to be reused when the tread becomes worn, rather than discarded. They also allow the same tire carcass to be equipped with various types of treads. This concept would also seem to have promise for use in tires used for heavy equipment. As an example, such tires can have a rim diameter of 50 inches and a rim width of 25 inches. The tires are subjected to brutal conditions and therefore must be built to withstand a great deal of abuse. Furthermore, the traction of such tires must be maximized.

SUMMARY OF THE INVENTION

It is an object of this invention to provide a removable tread belt that is particularly well suited for use in off road equipment.

Another object of this invention is to provide a removable tread belt that provides a large ground contacting area.

Another object of this invention is to provide a removable tread belt that is strengthened to maximize the ability of the tire to withstand abuse.

Another object of this invention is to provide a removable tread belt that allows less mass in the tire carcass.

Another object of this invention is to provide a removable tread belt that offers protection to the side walls of the tire carcass.

Another object of this invention is to provide a strengthening member for a removable tread belt.

The removable tread belt to be described is adaptable for use with tire carcasses of any construction; bias, bias-belt or radial. The tire carcass can be of open or closed design. The tire carcass can be of virtually any aspect ratio, up to a maximum of 0.70. However, the aspect ratio is preferably between 0.40 and 0.55. The term aspect ratio means the ratio of radial height of the tire carcass to the maximum width, the radial height being measured from a tangent to the radially innermost surface of the smallest diameter bead cores to a tangent to the radially outermost point on the carcass ply, the width being measured between opposite points of the cord reinforcing structure that extends from the bead to bead.

The orientation of all elements in the following description is referenced to the axis about which the tire rotates.

The removable tread belt of this invention comprises a plurality of axially oriented plates and bars which have a T-shaped cross-sectional configuration and which are installed in a rubber matrix, advantageously along with an inextensible annular belt disposed adjacent to the bars. At each end of the bar is an enlarged shoulder portion which is aligned with the axially outer edges of the belt matrix. The bars are normally spaced apart a maximum distance little greater than their circumferential width. The ends of the bars and the tread belt can extend axially outwardly to a point beyond the carcass side wall on at least one side of the tire, when the carcass side wall is loaded and flexed outwardly in its operating position. The belt matrix is equipped on its inner surface with a pattern of raised and lowered portions, such as annular lands and grooves, that interlock with the complementary pattern on the outer circumferential surface of the tire carcass to prevent axial movement of the tread belt with respect to the tire carcass. Circumferential movement can be prevented in this manner also, if need be.

The particular cross-sectional configuration of the bars provides a great deal of strength, especially in the radial direction. The bars strengthen the tread axially, insuring that the entire axial dimension of the tread is kept flat, thus maximizing the axial dimension of the footprint of the tread upon the ground. The T-shaped construction allows this strength to be acquired without necessitating undue thickening of the bars. The axial bars also support the axially outermost portions of the tread belt, so that the tread can be considerably wider than the outer circumferential surface of the tire carcass upon which it is mounted. This means that the ground engaging tread can be wider for a given tire carcass, without the need for supporting tire carcass structure beneath. Thus, a large amount of rubber mass at the shoulder portion of the tire carcass is eliminated, reducing weight, cost and heat build-up in the tire. Also, by this arrangement, the removable tread can be extended axially outwardly to a point equal to or beyond the tire carcass side wall, and it then protects the tire side wall from damage by rocks and the like, and from scuffing. This can be done on both sides of the tire. Such protection is especially important in the case of radial tire carcasses, which generally have more flexible side walls. The presence of the metal bars is also a barrier to penetration of the belt and the tire carcass by sharp objects. The upwardly extending shoulders on the ends of the bars offer protection to the tread belt, because they absorb impacts in the axial direction, and protect from scuffing.

The bars are installed within the belt matrix. The end portions can be exposed, or covered by a thin film of rubber, in order to prevent deterioration to corrosion. The metal bars can also be made removable, by providing a recess in the inner circumferential surface of the belt matrix, in which the bars are installed.

The tire carcass used with this invention has a pattern on its circumferentially outer surface as explained above, to interlock with the tread belt. This outer surface is bounded by two carcass shoulders. The axial distance between the two shoulders is advantageously less than the axial dimension of the inextensible annular belt in the tread belt matrix.

The inextensible annular belt is laid around the tire radially outwardly of the bars. Upon inflation, the tire carcass presses outwardly against the replaceable belt, which holds carcass and belt together, as well as stabilizing and anchoring the bars. All of the known additional virtues of such a belt will also thus be present in the tire.

DESCRIPTION OF A PREFERRED EMBODIMENT

Figure 1:
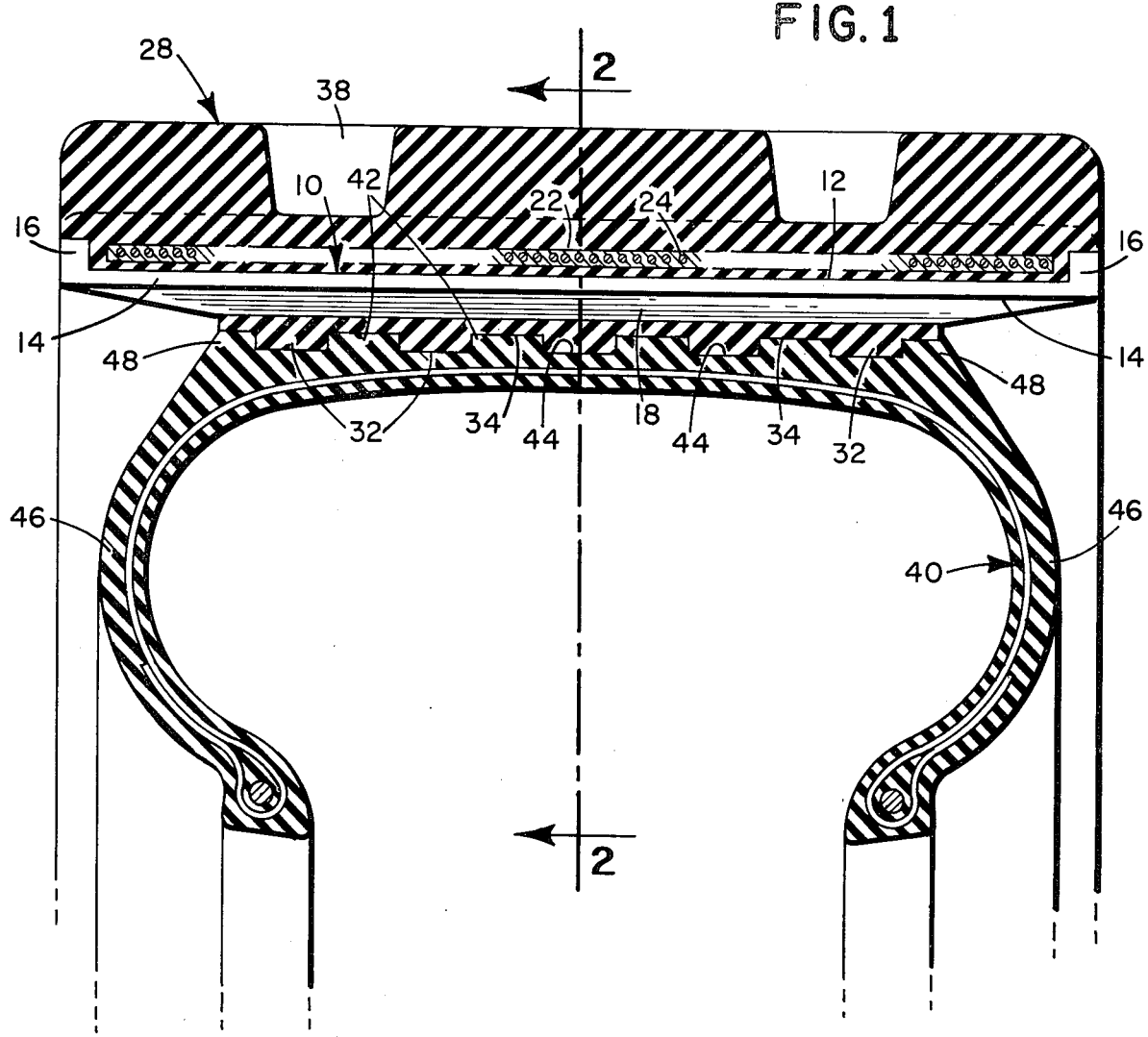
FIG. 1 is a cross-sectional view of a tire carcass and replaceable tread belt as constructed in accordance with the teachings of this invention.
Figure 2:
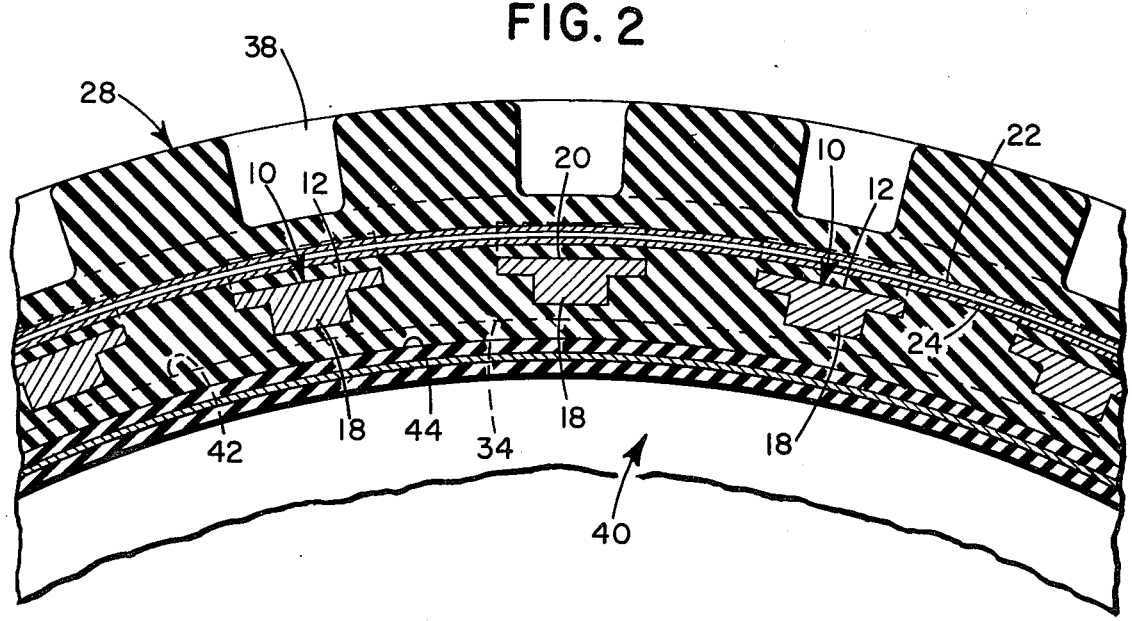
FIG. 2 is a sectional view of the construction of FIG. 1 taken along line 2—2 of FIG. 1.
Figure 3:
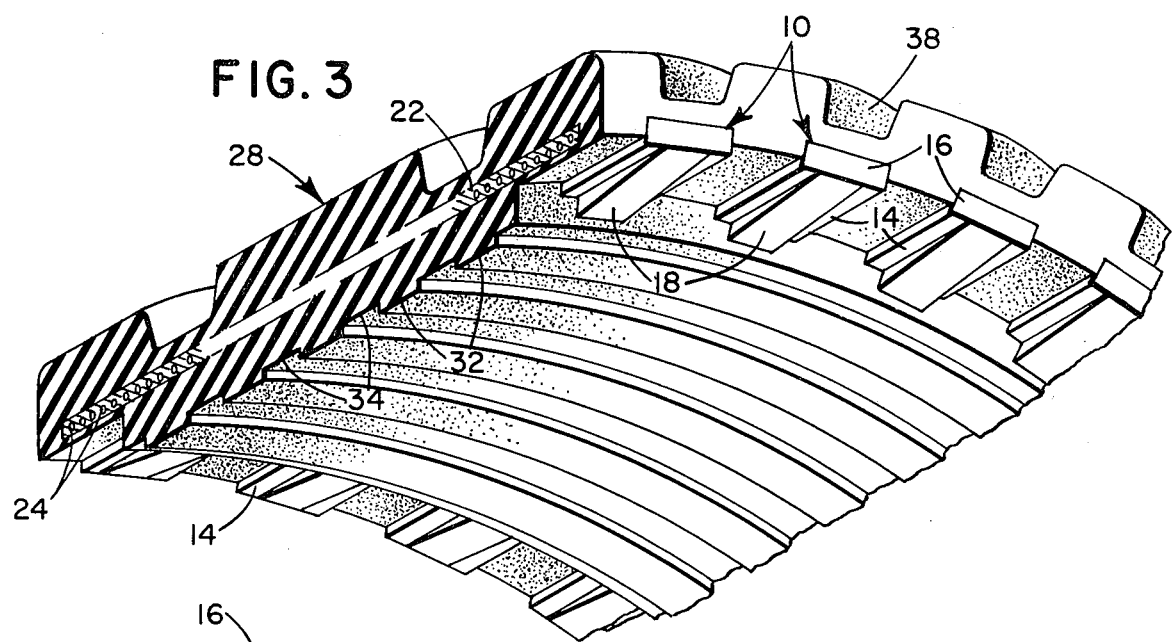
FIG. 3 is a bottom perspective view of a portion of a replaceable tread belt of FIGS. 1 and 2.
Figure 4:
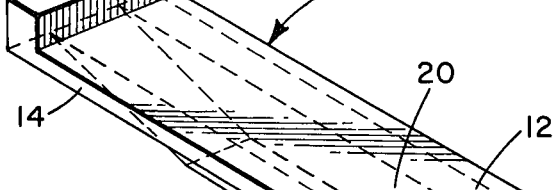
FIG. 4 is a top perspective view of one of the bars, removed from the tread belt.
Figure 5:
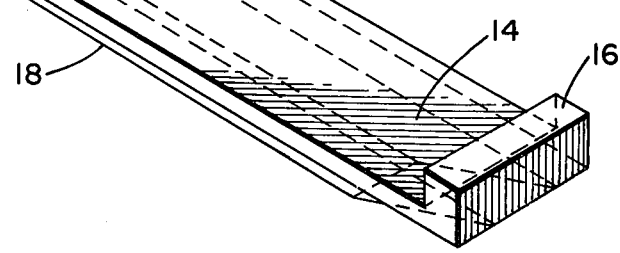
FIG. 5 is a side view of an alternative embodiment of the bar of this invention.
Figure 5:
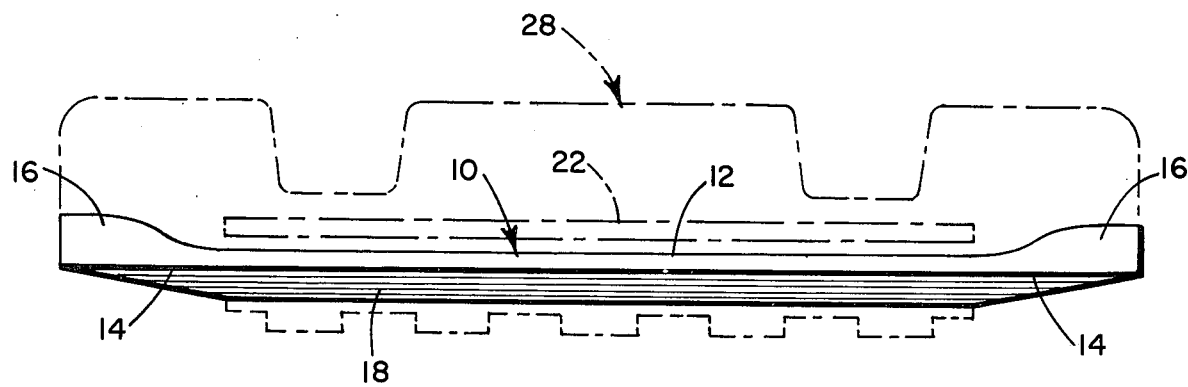

The removable tread belt shown in all of the figures comprises a plurality of axially oriented metal bars or plates 10 spaced apart at intervals around the entire belt. Each bar has a center portion 12 flanked by a pair of identical end portions 14. Each end portion 14 terminates in an upwardly oriented shoulder 16. A downwardly oriented rib 18 tapers radially outwardly at end portions 14. A plane through the outer circumferential surface 20 of each bar 10 is perpendicular to a radius of the tire. The rib is radially oriented. In a typical installation, the bars are spaced apart circumferentially around the tire a distance of between 75 and 125% of the circumferential dimension of the bar. It has been found that too much separation between adjacent bars diminishes their effectiveness, while too little separation might cause the rubber to separate from that portion of the tire contacting the ground.

Spaced radially slightly outside of the plurality of bars 10 is an inextensible belt 22 which is comprised of fabric and helically wound wires 24. The wires of the belt are of substantially zero degree orientation in regard to the circumferential axis and are advantageously so spaced apart axially as to present in cross-section about five ends per inch.

Bars 10 and inextensible belt 22 are in a preferred form of the invention substantially entirely encapsulated in a rubber belt matrix 28. End portions 14 of plates 10 can protrude from a major portion of the belt matrix, but can also be covered with at least a thin film of rubber to protect them from becoming corroded. Belt matrix 28 is of substantially the same axial width as bars 10. The inner portion 30 of matrix 28 is provided on its circumferentially inner surface with a plurality of annular lands 32 and grooves 34. The outer portion of belt matrix 28 is provided with a ground contacting tread pattern 38 which can be of any desirable design and depth. The axially outer surfaces of belt matrix 28 on both sides of the tire are advantageously aligned with those of said bars.

The tire carcass 40 can be of many suitable structures and designs. Illustrated is a tire carcass having aspect ratio of about 40%. Tire carcass 40 can be of the open type, as shown in FIG. 1, or of the closed type, not shown. Tire carcass 40 has on its outer surface a plurality of lands 42 and grooves 44 that interlock with belt lands 32 and grooves 34. While circumferential lands and grooves are shown, variations to this can be made, so long as the replacable tread belt is held against axial movement with respect to the carcass. While simple carcass construction is shown, more complex ones could be used.

Tire carcass 40 has a pair of side walls 46 and a pair of upper shoulders 48. As stated above, end portions 14 extend axially outwardly a distance at least equal to, and advantageously greater than, that of the extremeties of side walls 46. While such extension has been shown as occurring on both sides of the tire, such can be done on one side only, if desired, or if required by restrictive equipment between tire and vehicle.

Outer shoulders 48 of the tire carcass extend axially outwardly a distance no greater than that of the inextensible belt 22. Bars 10 are strong enough to support the axially outer portions of the removable tread belt and therefore a substantial amount of support rubber can be eliminated from tire carcass 40. Such elimination of rubber mass reduces heat build up in the tire carcass, as well as reducing tire weight and cost.

While the bars 10 are described above as being substantially entirely encapsulated by belt matrix 28, other constructions lend themselves well to use with a bar having the characteristics described above. For example, the bar could be made removable by providing on the inner circumferential surface of belt matrix 28 a plurality of axial recesses, in which the bar 10 would fit.

The removable tread belt is installed around a deflated tire carcass. The lands and grooves are aligned, and the carcass is inflated. The radially outwardly expansion of the tire carcass is resisted by the inextensible belt, thus locking the replaceable tread belt to the tire carcass.

While modifications and variations in the above described preferred embodiment may now become evident to one skilled in the art, it should be understood that the scope of the invention is defined only by the breadth of the attendant claims.

I claim:

1. A removable tread belt for installing about the circumferential outer surface of a tire carcass comprising:

an annular belt matrix of axial width greater than that of said circumferential outer surface of said tire whereby said belt matrix will extend outwardly beyond the edges of said circumferential outer surface, a plurality of rigid bars installed in said belt matrix around the circumference thereof, each of said bars extending across the entire axial width of said belt matrix and being oriented parallel to a plane through the axis of rotation of the tire carcass, each said bar comprising a main portion oriented substantially perpendicular to a radius of said tire carcass and a rib oriented substantially radially of said tire, said main portion having a substantially rectangular cross-section with the long axis thereof oriented perpendicularly to a radius of the tire carcass and having a substantially unbroken bar outer surface distal said tire carcass extending across the axial width of said bar, an inextensible annular belt installed in said belt matrix and located radially outwardly of said bar outer surface, a ground contacting tread pattern on the outer circumferential surface of said belt matrix, and interlocking structure on the inner surface of said belt matrix for engaging complementing interlocking structure carried by the tire carcass.

2. The removable tread belt of claim 1 wherein each said bar is T-shaped in cross-section.

3. The removable tread belt of claim 1 wherein each said rib is at least in part tapered in the axial direction toward the axial ends of said bar.

4. The removable tread belt of claim 1 wherein said bars are spaced apart circumferentially a distance of from 75 to 125 percent of the circumferential dimension of said bar.

5. The removable tread belt of claim 1 wherein said bars extend axially outwardly at least to the outermost point of at least one side wall of the tire carcass.

6. The removable tread belt of claim 1 wherein each of said bars further comprise an enlarged portion on at least one end therof.

7. The removable tread belt of claim 6 wherein said enlarged portion comprises an upstanding shoulder.

8. The removable tread belt of claim 1 further comprising an upwardly extending shoulder on each said bar at the ends thereof, and wherein said inextensible annular belt is located axially between said shoulders.

9. The removable tread belt of claim 8 wherein the said enlarged portions are recessed in said tread so that the axially outermost surfaces of said enlarged portions are flush with those of said tread belt.

10. The removable tread belt of claim 1 wherein said interlocking structure comprises a plurality of lands and grooves so oriented as to prevent axial movement of said removable tread belt with respect to the outer circumferential surface of the tire carcass.

11. In combination with the removable tread belt of claim 1, a tire carcass comprising an outer circumferential surface having an axial dimension no greater than that of said bars.

12. The combination of claim 11 wherein said tire carcass further comprises complementary interlocking structure on said outer circumferential carcass surface engageable with said interlocking structure of said inner surface of said removable tread belt.

13. The combination of claim 11 wherein said carcass has an aspect ratio of not greater than 0.70.

14. The combination of claim 11 wherein said aspect ratio is in the range of 0.40 to 0.55.

15. The combination of claim 11 wherein said carcass is of radial ply construction.

* * * * *